United States Patent
Karl et al.

(10) Patent No.: US 7,593,735 B2
(45) Date of Patent: Sep. 22, 2009

(54) METHOD AND WIRELESSLY CONNECTABLE COMMUNICATIONS DEVICE FOR PACKET-ORIENTED DATA TRANSMISSION

(75) Inventors: Holger Karl, Paderborn (DE); Harald Müller, Gilching (DE); Morten Schläger, Berlin (DE); Jürgen Totzke, Poing (DE); Wei Xing, Nicosia (CY)

(73) Assignee: Siemens Aktiengesellschaft, Munich (DE)

( * ) Notice: Subject to any disclaimer, the term of this patent is extended or adjusted under 35 U.S.C. 154(b) by 262 days.

(21) Appl. No.: 10/547,602
(22) PCT Filed: Feb. 27, 2004
(86) PCT No.: PCT/EP2004/001993

§ 371 (c)(1),
(2), (4) Date: Oct. 24, 2006

(87) PCT Pub. No.: WO2004/079997

PCT Pub. Date: Sep. 16, 2004

(65) Prior Publication Data

US 2007/0036106 A1  Feb. 15, 2007

(30) Foreign Application Priority Data

Mar. 4, 2003 (DE) .................. 103 09 337

(51) Int. Cl.
*H04W 72/08* (2006.01)
(52) U.S. Cl. ............... 455/452.2; 455/436; 370/331
(58) Field of Classification Search ........... 455/436, 455/437, 438, 440, 441, 442, 443, 445, 446, 455/447, 448, 449, 450, 452.1, 452.2, 453; 370/331
See application file for complete search history.

(56) References Cited

U.S. PATENT DOCUMENTS 6,594,245 B1 * 7/2003 Rimhagen et al. .......... 370/337
7,239,618 B1 * 7/2007 La Porta et al. ............ 370/331
2002/0105926 A1 * 8/2002 Famolari et al. ........... 370/331

FOREIGN PATENT DOCUMENTS

| CN | 1353898 | | 6/2002 |
| DE | 100 35 701 A1 | | 1/2002 |
| DE | 101 03 103 A1 | | 8/2002 |
| DE | 102 05 907 A1 | | 8/2003 |
| EP | 0 577 322 A1 | | 1/1994 |
| EP | 1 047 279 A2 | | 10/2000 |
| WO | WO 00/59160 A1 | | 10/2000 |
| WO | WO 03/017689 | * | 2/2003 |
| WO | WO 03/017689 A1 | | 2/2003 |

OTHER PUBLICATIONS

Tao Zhang, Prathima Agrawal and Jyh-Cheng Chen, "IP-Based Base Stations and Soft Handoff in All-IP Wireless Networks", IEEE Personal Communications Society, US, Oct. 2000, pp. 24-30, XP000864164.

* cited by examiner

*Primary Examiner*—Blane J Jackson

(57) ABSTRACT

In order to transmit data packets between a wirelessly connectable communications device and a communications partner, particularly during a handover process, the invention provides that when a first wireless transmission path is available, an availability of at least one additional wireless transmission path is detected. Based on the detection, a specific assignment schema, via which at least one portion of the data packets is assigned to each of the transmission paths, is selected according to specific transmission requirements and/or to a transmission protocol to be used for transmitting the data packets. An address specification specific to the transmission path is then assigned to a respective data packet that is assigned to a transmission path. By using the assigned address specifications, the data packets are transmitted via the different transmission paths between the communications device and the communications partner according to the selected assignment schema.

22 Claims, 2 Drawing Sheets

METHOD AND WIRELESSLY CONNECTABLE COMMUNICATIONS DEVICE FOR PACKET-ORIENTED DATA TRANSMISSION

CROSS REFERENCE TO RELATED APPLICATIONS

This application is the US National Stage of International Application No. PCT/EP2004/001993, filed Feb. 27, 2004 and claims the benefit thereof. The International Application claims the benefits of German application No. 10309337.0, filed Mar. 4, 2003, both applications are incorporated by reference herein in their entirety.

FIELD OF INVENTION

The invention relates to a method and a wirelessly connectable communications device for packet-oriented data transmission.

SUMMARY OF THE INVENTION

Contemporary packet-oriented communications networks, such as e.g. local area networks (LANs) or wide area networks (WANs) like the Internet, are increasingly equipped with base stations for wirelessly connecting communications devices. Such a base station connected to a communications network forms a wireless access point for this communications network. Examples of communications devices wirelessly connectable to a packet-oriented communications network are mobile network and data processing devices, such as e.g. laptops, notebooks and PDAs (personal digital assistants) equipped with air interfaces and Internet-Protocol-based mobile voice, video, fax, multimedia and data input/output devices. A packet-oriented local area network with wirelessly connected communications devices is frequently also called a WLAN (wireless LAN).

Based on an increasing integration of different communications and data processing applications, particularly where real-time and data communications are combined, a multitude of different transmission requirements are frequently placed upon a communications network. Wirelessly connecting communications devices to a packet-oriented communications network frequently leads, however, to falls in transmission performance and flexibility and to greater susceptibility to faults and disruptions, particularly during a handover process. A handover is the usual term for switching over the radio connection of a communications device from one base station to another base station.

In an Internet-Protocol-based communications network, a handover of a communications device often results in the communications device being assigned a new IP address (IP: Internet Protocol). However, in the case of TCP connections (TCP: Transmission Control Protocol), a change in the IP address of a connection endpoint causes an existing TCP connection to be torn down and a new TCP connection based upon the new IP address to be set up. A connection interruption of this type can, however, have a highly detrimental impact, particularly in the case of real-time connections, for example by disconnecting a signaling connection.

The object of the present invention is to specify a method for packet-oriented data transmission that will allow a more flexible adaptation to different communication conditions, particularly during a handover process. A further object of the invention is to specify a wirelessly connectable communications device for implementing the method.

This object is achieved by the claims.

In order to transmit data packets between a wirelessly connectable communications device and a communications partner, the invention provides that when a first wireless transmission path is available, an availability of at least one additional wireless transmission path is detected. Based on the detection, a specific assignment schema, via which at least one portion of the data packets is assigned to each of the transmission paths, is selected according to specific transmission requirements and/or to a transmission protocol, such as e.g. TCP, STCP or UDP, to be used for transmitting the data packets. The transmission requirements can for example relate to transmission bandwidth requirements, to a maximally admissible error rate or to real-time requirements. In accordance with the assignment schema selected, an address specification specific to the transmission path, e.g. an IP address or a combination of IP address and port number, is assigned to a respective data packet that is assigned to a transmission path. By means of an address specification specific to a transmission path, one respective transmission path can be distinguished from other transmission paths. By using the assigned address specifications, the data packets are transmitted via the different transmission paths between the communications device and the communications partner according to the selected assignment schema.

The invention makes it possible to use in an advantageous and flexible manner a parallel availability of a plurality of wireless transmission paths. Relevant transmission characteristics can be optimized in a protocol-specific manner through a protocol-specific apportionment of the data packets to be transmitted to different transmission paths. This is particularly advantageous when applications running on the wirelessly connectable communications device use different transmission protocols such as e.g. TCP and UDP in parallel. For each such transmission protocol used in parallel, a specific assignment schema that is specially adapted to this transmission protocol can be selected.

By selecting an assignment schema according to specific transmission requirements, a respective apportionment of data packets to different transmission paths can be adapted in a targeted manner to different requirements e.g. for real-time transmissions or data transmissions. Thus, for example, in order to increase the data transmission rate, consecutive data packets can alternately be transmitted via different transmission paths. Alternatively, in order to reduce the error rate, each data packet or a selection of the data packets can be transmitted redundantly via a plurality of transmission paths. Optionally, particularly relevant data packets, e.g. data packets containing signaling information, can be transmitted redundantly via a plurality of transmission paths and less relevant data packets via alternating transmission paths.

Because of the assignment of path-specific address information to the data packets to be transmitted, conventional router software can be used in order to guide the data packets packet-specifically via the different transmission paths. Unlike the situation when transmitting by multicast address, with path-specific address information, individual control of path selection is possible.

The invention can be applied particularly advantageously in handover processes during which the communications device is located, at least temporarily, within radio range of a plurality of base stations. By apportioning the data packets to different transmission paths in a manner adaptable to the current transmission situation, the risk of data losses or of transmission interruptions can be reduced considerably. Application of the invention is not, however, restricted just to handover processes, but can advantageously be extended to the general case in which the communications device is located simultaneously within radio range of a plurality of base stations which may also belong to different radio networks.

Advantageous embodiments and further developments of the invention are specified in the dependent claims.

According to an advantageous further development of the invention, one or more specific transmission characteristics such as e.g. transmission capacity, bandwidth, transmission delay and/or quality of service of the at least one additional transmission path can be recorded. Selection of the assignment schema can then be effected according to the recorded transmission characteristics. Furthermore, selection of the assignment schema can be effected according to an estimated value for the duration of availability of at least one of the transmission paths and/or according to the number of available transmission paths. In addition, the assignment of a respective data packet to at least one transmission path can be undertaken according to the type, content and/or intended purpose of the data packet.

Thus, for example, real-time data can be transmitted via one transmission path which has, at least currently, particularly good real-time characteristics, and signaling and general data via another transmission path. Real-time data and general data can also be transmitted in combination, the two data types being apportioned to the different transmission paths in a manner that differs and is in each case optimally adapted to their transmission requirements. For example, in the case of a multimedia transmission using the UDP protocol, particularly relevant data packets, such as e.g. I-frames in an MPEG coding, can be transmitted via a plurality of transmission paths and less relevant data packets via alternating paths. Furthermore, in the case of TCP-based transmissions, for example, data packets to be transmitted for the first time can be transmitted in each case alternately via a plurality of transmission paths and transmission repeats in parallel via a plurality of transmission paths or via a transmission path not used for the first-time transmission.

The assignment of data packets to transmission paths can be executed in the transport layer, i.e. in layer 4 as per the OSI reference model, and/or in a protocol layer lying thereabove, e.g. in layer 7 or in a modified socket layer.

According to a further advantageous further embodiment of the invention, the assignment of data packets to the transmission paths can be effected according to transmission parameters recorded within the framework of a flow check and/or overload check.

An exemplary embodiment of the invention will be described in detail below with reference to the drawings.

DETAILED DESCRIPTION OF INVENTION

Figure 1:
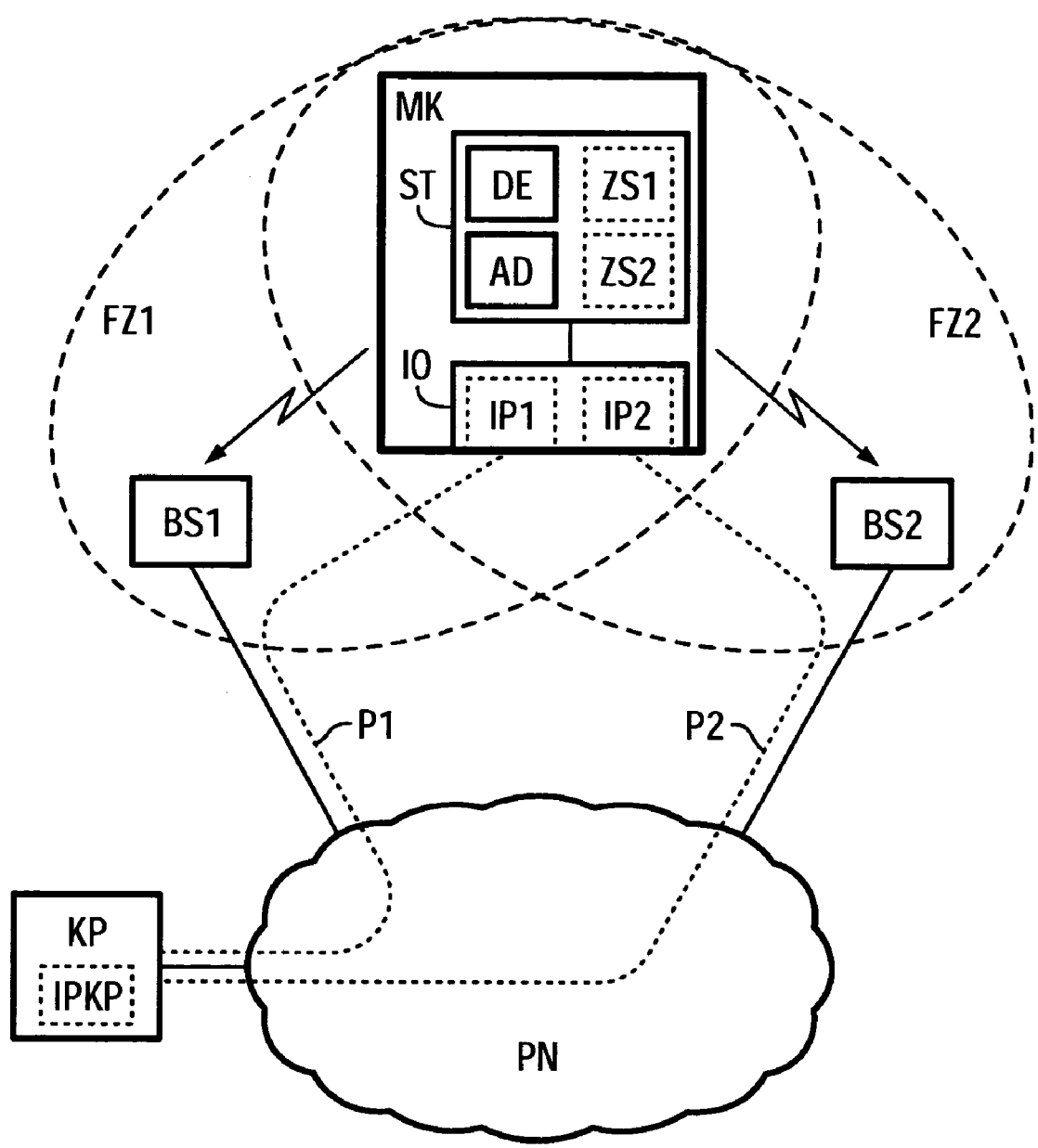
FIG. 1 shows a communications system comprising a wirelessly connectable communications device with different wireless transmission paths to a communications partner.

FIG. 1 shows schematically a communications system comprising a packet-oriented communications network PN to which base stations BS1 and BS2 are respectively connected via a network interface, e.g. Ethernet. The communications network PN is implemented in the present exemplary embodiment as an IP-based WLAN (wireless local area network). The base stations BS1 and BS2 form what are termed WLAN access points, e.g. to IEEE standard 802.11b, for wirelessly connecting IP communications devices to the communications network PN.

The base stations BS1 and BS2 form radio cells FZ1 and FZ2 which overlap spatially. A radio cell is the usual term designating a spatial area around a base station in which communications devices can be wirelessly connected to this base station. The radio cells FZ1 and FZ2 are illustrated in FIG. 1 by dashed ellipses.

In the present exemplary embodiment, a mobile communications device MK is located in the area of overlap between the two radio cells FZ1 and FZ2 and. is, as indicated by stylized lightning flashes, wirelessly connected via the two base stations BS1 and BS2 to the communications network PN. The mobile communications device MK can for example be a mobile network or data processing device such as e.g. a laptop, notebook or PDA (personal digital assistant) or a communications application running thereon or a communications client. Besides these, the mobile communications device MK can also be implemented by a mobile voice, video, fax, multimedia or data input/output device or by an IP-based mobile telephone.

The mobile communications device MK exchanges data packets with a communications partner KP connected to the communications network PN via the communications network PN, e.g. within the framework of a voice, video, multimedia and/or data transmission. An IP address IPKP is assigned to the communications partner KP, via which address the communications partner KP can be uniquely addressed in the communications network PN. A plurality of transmission paths P1 and P2 are available in parallel, at least temporarily, for the transmission of data packets between the mobile communications device MK and the communications partner KP. While the first transmission path P1 leads from the mobile communications device MK via the base station BS1 and the communications network PN to the communications partner KP, the second transmission path P2 runs via the base station BS2 and the communications network PN to the communications partner KP. The transmission paths P1 and P2 are illustrated in FIG. 1 by dotted lines.

It is assumed for the present exemplary embodiment that the communications network PN comprises a plurality of layer 2 nodes (bridges) and a plurality of layer 3 nodes (routers) and consequently a plurality of different subnetworks. In such a case, different IP addresses IP1 and IP2 are assigned by the two base stations BS1 and BS2 to the mobile communications device MK in the course of their connecting to the base stations. The IP addresses IP1 and IP2 are path-specific, IP1 being assigned to the transmission path P1 and IP2 to the transmission path P2. Following assignment of the IP addresses IP1 and IP2, the transmission paths P1 and P2 are available. Using the IP addresses IP1 and IP2, which differ from one another, the transmission paths P1 and P2 can be distinguished and explicitly addressed or selected in both transmission directions. The IP addresses IPI and IP2 are valid network addresses in the communications network PN, i.e. effective address specifications on layer 3 of the OSI reference model, using which data packets can be routed via the transmission paths P1 and P2. Alternatively or additionally, the distinguishing of the transmission paths P1 and P2 can also be effected using different port numbers which are assigned to the transmission paths P1 and P2. In this way, data packets labeled with IP1 as a destination address are routed by the communications partner KP through the communications network along the transmission path P1 to the base station BS1 and from this base station to an IP interface of the mobile communications device MK assigned to the IP address IP1. Correspondingly, data packets with a destination address IP2 are transmitted through the communications network PN along the transmission path P2 to the base station BS2 and from this base station to an IP interface of the mobile communications device MK assigned to the IP address IP2. Data packets which are to be transmitted from the mobile communications device MK to the communications partner KP are, depending on the inserted source IP address, transmitted via the transmission path P1 or P2. That is, data packets labeled with the IP address IPKP as destination address and with the IP address IP1 as source address are transmitted via the IP interface of the mobile communications device MK assigned to the IP address IP1 to the base station BS1 and from this base station via the communications network PN to the communications partner KP. Analogously, data packets labeled with the IP address IP2 as source address are transmitted via the base station BS2 to the communications partner KP.

In order to transmit and receive data packets, the mobile communications device MK has a send/receive device IO. The send/receive device IO has for each wireless access point, here the base station BS1 or BS2, via which the mobile communications device MK can be connected to the communications network KN, a separate IP interface in each case. The IP interfaces are respectively assigned to a specific IP address, here IP1 or IP2. The IP interfaces can preferably be implemented by means of sockets.

The mobile communications device MK also has control means ST connected to the send/receive device IO for controlling data transmission. The control means ST can for example be implemented by means of program modules, operating system functions or software objects. The control means ST comprise detector means DE for detecting different wireless transmission paths, here P1 and P2, a plurality of assignment schemas ZS1 and ZS2, via which at least a portion of the data packets to be transmitted are respectively assigned to each of the transmission paths P1 and P2, and addressing means AD for inserting source and/or destination IP addresses into data packets according to a respective assignment schema ZS1 or ZS2.

The different assignment schemas ZS1 and ZS2 can be implemented e.g. as program instructions which optionally have recourse to different tables or as different, optionally invokable or callable subroutines. It is assumed for the present exemplary embodiment that consecutive data packets of a data stream are alternately assigned by the assignment schema ZS1 to the transmission path P1 and the transmission path P2 and all the data packets of a data stream are assigned by the assignment schema ZS2 to the two transmission paths P1 and P2.

Besides the specified assignment schema ZS1 and ZS2, one or more additional assignment schemas can be provided as intermediate forms; e.g. an assignment schema via which a portion to be specified of the data packets to be transmitted is assigned to a plurality of transmission paths.

A respective assignment schema, here ZS1 or ZS2, is dynamically and adaptively selected by the control means ST according to a transmission protocol to be used for data transmission and/or according to dynamically recorded transmission requirements, e.g. with regard to real-time requirements or bandwidth requirements, from a plurality of different assignment schemas, here ZS1 and ZS2. In the selection of an assignment schema, dynamically recorded transmission characteristics of the available transmission paths, here P1 and P2, can preferably also be taken into account.

Figure 2:
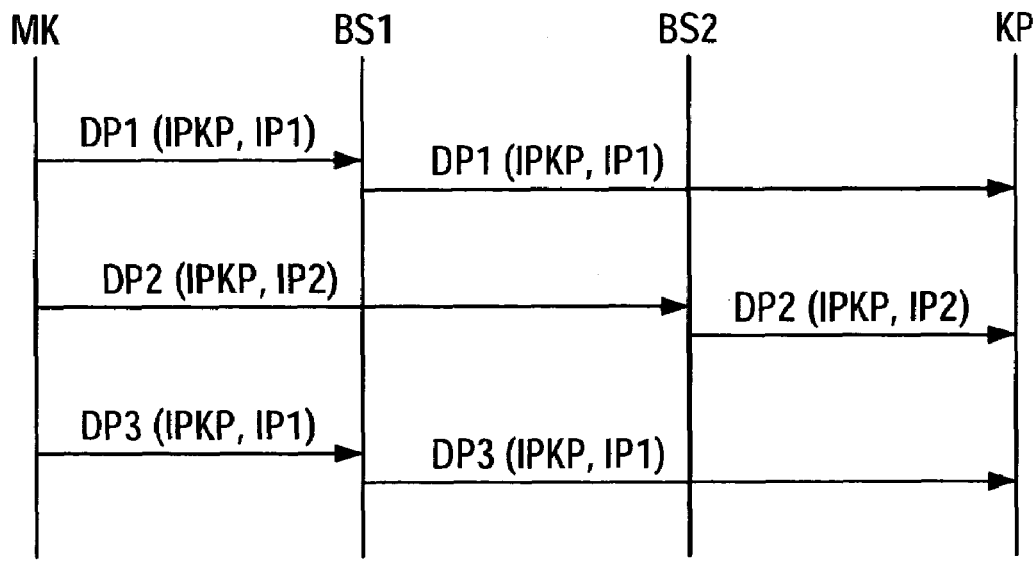
FIG. 2 shows an exemplary first flow diagram for illustrating a data transmission via the different transmission paths.
Figure 3:
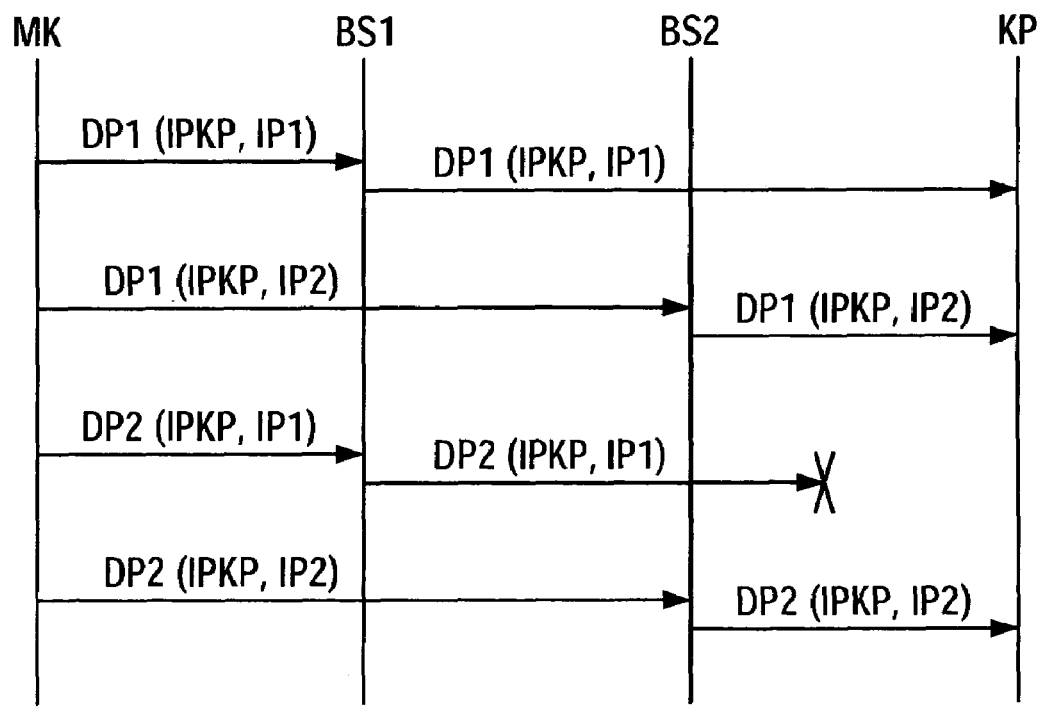
FIG. 3 shows an exemplary second flow diagram for illustrating a data transmission via the different transmission paths.

FIGS. 2 and 3 show respectively a flow diagram to illustrate a data transmission via the different transmission paths P1 and P2 when different assignment schemas ZS1 and ZS2 are selected. Examined in each case is a transmission of consecutive data packets DP1, DP2 and DP3 of a data packet stream with UDP (User Datagram Protocol) as the transport protocol from the mobile communications device MK to the communications partner KP. The data packets DP1, DP2 and DP3 are each furnished with the IP address IPKP of the communications partner KP as the destination address.

FIG. 2 illustrates a transmission based on the assignment schema ZS1. The assignment schema ZS1 is selected by the control means ST in a dynamic manner for transmitting a data stream when there are increased requirements in terms of the transmission rate of the data stream, e.g. in the case of real-time, voice or video transmissions. According to the assignment schema ZS1 selected, the consecutive data packets DP1, DP2 and DP3 are packet-specifically furnished by the addressing means AD alternately with the IP addresses IP1 and IP2 as the respective source address. The data packets DP1, DP2 and DP3 are then routed by the send/receive device IO according to their source address IP1 or IP2 via the corresponding IP interface via the transmission path P1 or P2. That is, the data packets DP1 and DP3 furnished with the IP address IP1 as source address are transmitted via the base station BS1 and consequently via the transmission path P1 to the communications partner KP. Analogously, the data packet DP2 furnished with the IP address IP2 as source address is routed via the base station BS2 and consequently via the transmission path P2 to the communications partner KP. Since the data stream is evenly apportioned between the two available transmission paths P1 and P2, the sum of the transmission rates of the transmission paths P1 and P2 is available for the data stream. The effective bandwidth for transmission of the data stream is consequently increased.

FIG. 3 illustrates a transmission of a data stream based on the assignment schema ZS2. The assignment schema ZS2 is dynamically selected by the control means ST e.g. when only a low transmission rate is admissible such as e.g. in the case of program data. According to the selected assignment schema ZS2, the data packets DP1 and DP2 are in each case packet-specifically assigned to the two transmission paths P1 and P2. In order to transmit data packets P1 and P2 in parallel via the two transmission paths P1 and P2, the data packets DP1 and DP2 are respectively duplicated. The IP address IP1 is then inserted via the addressing means AD as source address into respectively a first of the duplicated data packets DP1 and DP2 and the IP address IP2 into respectively a second of the duplicated data packets DP1 and DP2. The duplicated data packets DP1 and DP2 are routed by the send/receive device IO in each case according to their source address IP1 or IP2 via the corresponding IP interfaces via the transmission paths P1 and P2. That is, the data packets DP1 and DP2 are respectively transmitted both via the base station BS1 and via the base station BS2. If a data packet, for example the data packet DP2 transmitted via the transmission path P1 to the communications partner KP—as indicated in FIG. 3 by a cross—is lost, then the data packet DP2 received via the transmission path P2 can be selected and processed by the communications partner KP without it being necessary for the data packet to be requested again.

If, in addition, information about available transmission capacities of the transmission paths P1 and/or P2 is recorded, then the apportionment of the data packets to be transmitted to the transmission paths P1 and P2 can be adapted to the recorded information. The adaptation can be effected by selecting a new assignment schema or by modifying an existing assignment schema.

Furthermore, the decision on the extent to which data packets are transmitted in parallel or alternatively via a plurality of transmission paths can be reached according to an estimation of path stability at the level of the link layer and/or to the duration of the simultaneous availability of a plurality of transmission paths.

The invention claimed is:

1. A method for transmitting a sequence of data packets between a wirelessly connectable communications device and a communications partner, comprising:
   a) providing the communications device with a separate IP interface for each of at least two wireless access points;
   b) when a first wireless transmission path is available, detecting an availability of at least one second wireless transmission path, and providing a sequence of at least two IP addresses as source addresses of the wireless communications device, each IP address associating a different IP interface with each wireless transmission path;
   c) generating a first assignment schema configured to assign each data packet an address specification and effect assignment of data packets to the first wireless transmission path and at least one second wireless transmission path;
   d) transmitting the data packets via the first wireless transmission path and at least one second wireless transmission path between the communications device and the communications partner based on the address specification assigned to each data packet;
   e) recording transmission capacities of the first and at least one second wireless transmission paths; and
   f) replacing the first assignment schema with a second assignment schema that is different than the first assignment schema.

2. The method according to claim 1, wherein the data packets are comprised of a first set of data packets and a second set of data packets that have content identical to content of the first data packets and wherein the second assignment schema is configured to send the first set of data packets along the first wireless transmission path and the second set of data packets along the at least one second wireless transmission path.

3. The method according to claim 2, wherein the assignment of a respective data packet to at least one of the wireless transmission paths is effected according to the intended purpose of the data packet.

4. The method according to claim 2, wherein the assignment of the data packets to the wireless transmission paths is executed in the transport layer and/or a protocol layer lying thereabove in accordance with the OSI reference model.

5. The method according to claim 1, wherein the generation of the first assignment schema is effected according to an estimated value for the duration of the availability of at least one of the transmission paths.

6. The method according to claim 5, wherein the assignment of a respective data packet to at least one of the wireless transmission paths is effected according to the type, content, and/or intended purpose of the data packet.

7. The method according to claim 1 wherein the replacement of the first assignment schema is effected according to an estimated value for the duration of the availability of at least one of the transmission paths.

8. The method according to claim 1, wherein the generation of the first assignment schema is effected according to the number of available transmission paths.

9. The method according to claim 8, wherein the at least two IP addresses is two IP addresses and the first assignment schema alternately assigns to each data packet one of the two IP addresses so that the assignment of data packets sequentially alternates between the first wireless transmission path and the at least one second wireless transmission path.

10. The method according to claim 8, wherein the assignment of the data packets to the wireless transmission paths is executed in the transport layer and/or a protocol layer lying thereabove in accordance with the OSI reference model.

11. The method according to claim 1 wherein the replacement of the first assignment schema is effected according to the number of available transmission paths.

12. The method according to claim 1 wherein the data packets are comprised of a first set of data packets and a second set of data packets that are substantially identical to the first set of data packets and wherein the first assignment schema is configured to transmit the first set of data packets via the first wireless transmission path and the second set of data packets via the at least one second wireless transmission path.

13. The method according to claim 12, wherein the assignment of the data packets to the wireless transmission paths is executed in the transport layer and/or a protocol layer lying thereabove in accordance with the OSI reference model.

14. The method according to claim 1, wherein the assignment of a respective data packet to at least one of the wireless transmission paths is effected according to the type or content of the data packet.

15. The method according to claim 14, wherein the assignment of the data packets to the wireless transmission paths is executed in the transport layer and/or a protocol layer lying thereabove in accordance with the OSI reference model.

16. The method according to claim 1, wherein the assignment of the data packets to the wireless transmission paths is executed in the transport layer and/or a protocol layer lying thereabove in accordance with the OSI reference model.

17. The method according to claim 1, wherein the assignment of the data packets to the wireless transmission paths is effected according to transmission parameters recorded as part of a flow check and/or overload check.

18. The method according to claim 1, wherein transmitting of the data packets takes place during a handover process.

19. The method according to claim 1 wherein the second assignment schema is a modification of the first assignment schema.

20. The method according to claim 1 wherein the first assignment schema is configured for transmitting the data packets such that the data packets are alternatively routed via the first wireless transmission path and the at least one second wireless transmission path and wherein the second assignment schema is configured for parallel transmission of the data packets via the first wireless transmission path and the at least one second wireless transmission path.

21. The method according to claim 20 wherein the replacement of the first assignment schema is occurs when only a low transmission rate is admissible.

22. The method of claim 20 wherein the replacement of the first assignment schema is determined based on an estimation of transmission path stability for at least one of the first wireless transmission path and the at least one second wireless transmission path.

* * * * *